United States Patent Office 2,699,681
Patented Jan. 18, 1955

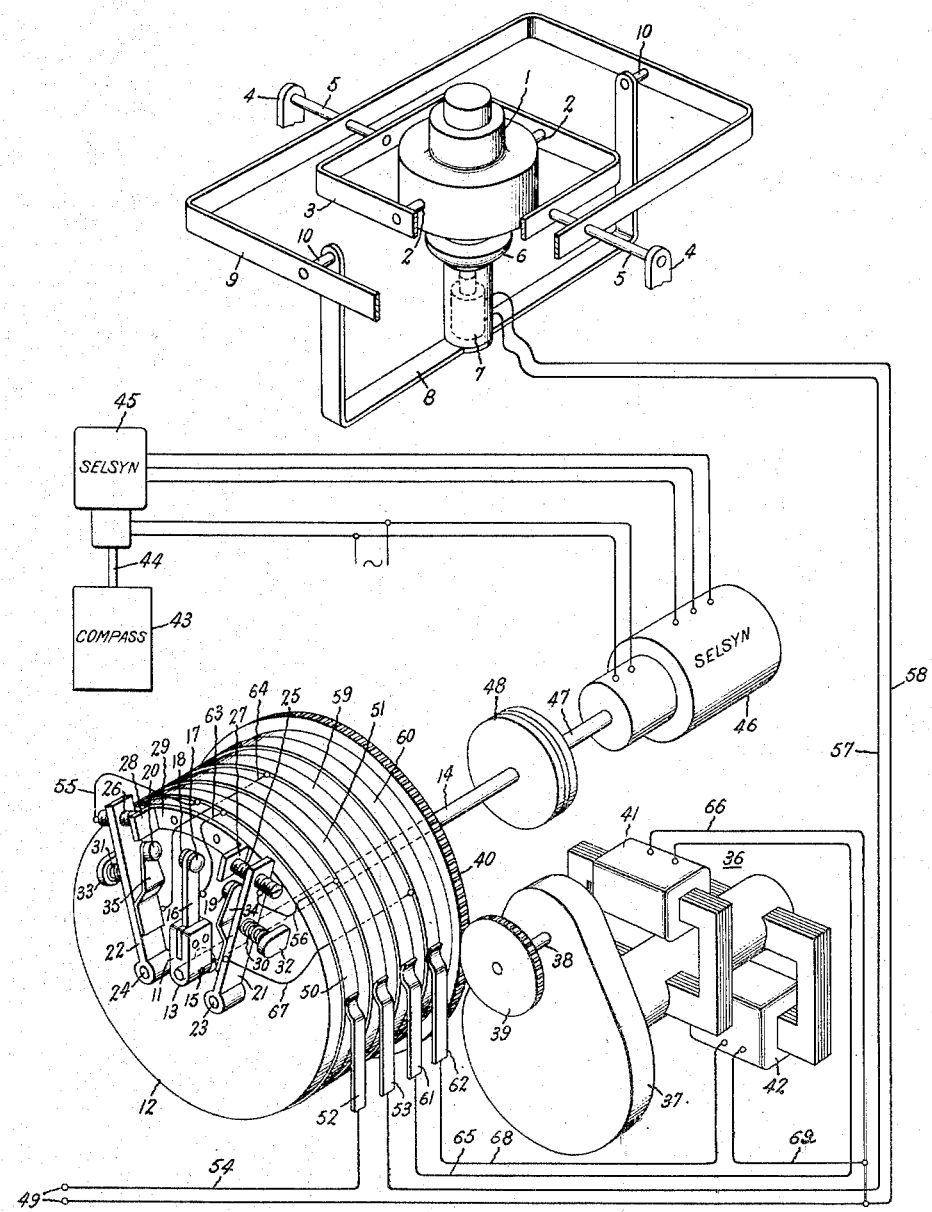

2,699,681

GYROSCOPE

Ramond J. Johnson, Schenectady, N. Y., assignor to General Electric Company, a corporation of New York Application May 11, 1946, Serial No. 669,195

6 Claims. (Cl. 74—5.41)

The present invention relates to gyroscopes, and more particularly to an improved arrangement for disconnecting the erecting device of a gyro vertical during turns of the vehicle on which the gyroscope is mounted to prevent turn error.

It is common practice in gyro verticals to bring the gyroscope into the vertical by means of an erecting device which usually comprises a gravitationally resposive element such as a pendulum and gyro precessing means controlled by the position of the pendulum. The gyro precessing rate is such that the response of the gyro to small swings of the pendulum is so slow, compared to the period of such swings, that the vertical is maintained to a high degree of accuracy. However, when such a gyroscope is used on moving vehicles, such as ships or aircraft, such an erecting device gives rise to an error known as "turn error" when the vehicle goes into a turn. This error arises from the fact that the centrifugal force acting on the pendulum during a turn throws the pendulum out of vertical, whereupon the gyro is precessed to an erroneous reference position. In order to avoid this difficulty, it is common practice to provide means for disabling the erecting device when the vehicle makes a turn at a rate greater than a predetermined value. Heretofore devices provided for accomplishing this disconnecting function have been complicated, expensive to manufacture, and difficult to keep in adjustment.

An object of the present invention is to provide an improved arrangement for disconnecting the erection system of a gyro vertical during turns of the vehicle on which the gyroscope is mounted.

A further object of the invention is to provide a gyroscope erection system cutout device which operates accurately to disconnect the erection system at a predetermined rate of turn, and which is simpler in construction and more reliable in operation than cutout devices which have been used for this purpose heretofore.

Further objects and advantages of my invention will become apparent as the following description proceeds, and the features of novelty which characterize my invention will be pointed out with particularity in the claims annexed to and forming a part of this specification.

My invention will be better understood by reference to the following detailed description taken in connection with the accompanying drawing in which the single figure is a schematic representation of a gyro vertical provided with an erection cutout device constructed in accordance with the present invention.

Referring to the drawing, I have shown in schematic form a gyroscope of the vertical spin axis type, frequently referred to as the gyro vertical, which may be used on moving vehicles, such as ships, aircraft, and the like, for indicating the direction of the true vertical, for control purposes, or both. The gyroscope is shown as comprising a rotor bearing frame 1 which rotatably supports the gyro rotor (not shown) so that the spin axis of the gyroscope extends in approximately the vertical direction. The gyro-bearing frame 1 is supported for universal movement in the usual way. To this end the rotor-bearing frame 1 is provided with horizontally extending trunnions 2, which are pivotally mounted on a horizontal gimbal ring 3 which is in turn mounted for pivotal movement on fixed supports 4 by means of trunnions 5.

Due to gyroscope inertia, the spin axis of the gyroscope tends to maintain a fixed orientation in space. However, due to friction in the gimbal bearings and rotation of the earth, the gyroscope tends to wander from the vertical reference position, and it is therefore necessary to provide an erecting device responsive to the direction of gravity for slowly precessing the gyroscope to the vertical.

While any suitable type of erecting device may be used, I have chosen for the purposes of illustration to show an erecting device of the so-called eddy current type. The erecting device is shown as comprising a rotating eddy current disk 6 mounted to rotate with the gyroscope rotor and a cooperating pendulous electromagnet 7. The electromagnet 7, which is the gravity positioned element in this type of erecting device, is shown as being universally mounted on a pendulum or bail 8 which is pivotally mounted on a supplementary horizontal gimbal ring 9 by means of trunnions 10, the gimbal 9 being in turn pivotally mounted on the trunnions 5, as shown, so that the electromagnet 7 has universal freedom of motion.

The electromagnet 7 is positioned on the pendulum 8 so that the magnetic flux produced thereby, when the electromagnet is energized, flows through the eddy current disk 6 and results in the generation of eddy currents therein. So long as the spin axis of the gyroscope remains vertical, there is no eddy current drag torque tending to precess the gyroscope about its center of suspension. However, if the gyro departs from the vertical position indicated by the pendulum, an eddy current drag torque is applied to the rotor bearing frame 1 in a direction to restore correspondence between the gyroscope and the pendulum. This eddy current erecting action is well known and reference may be had to Patent No. 2,360,339 granted October 17, 1944, on application of A. Hansen, Jr., for a further description of the operating principles. The erecting system disclosed herein may be the same as that disclosed in the Hansen patent except that an electromagnet rather than a permanent magnet is used to provide the magnetic flux in the eddy current disk so that the erecting device can be disabled by deenergizing the electromagnet.

When gyro verticals of the type thus far described are used on moving vehicles, a difficulty is encountered arising from what is known as turn error. Turn error is caused by the effect of centrifugal action on the pendulum of the erecting device which throws the pendulum away from the true vertical during turns so that the gyro is precessed away from the true vertical position. In order to overcome turn error, it is customary practice to provide means for disconnecting or disabling the erection system of the gyroscope when the rate of turn of the vehicle exceeds a predetermined value beyond which the turn error otherwise becomes of unacceptable magnitude in high accuracy installations.

In accordance with my invention a new and improved cutout device is provided for this purpose which will now be described.

As clearly shown in the drawing, my improved cutout device comprises a first rotatable member 11 and a second independently rotatable member or drum 12, the axes of rotation of said members being concentric. The rotatable member 11 is shown as comprising a support 13 which is mounted on a rotatable shaft 14 and is secured to the shaft for rotation therewith by means of a pin 15. Mounted on the support 13 is a radially extending contact arm 16 formed of electrically conducting material which carries at its outer extremity two oppositely disposed contacts 17 and 18. The contacts 17 and 18 are adapted to selectively engage cooperating contacts 19 and 20, which are respectively mounted on pivoted switch arms 21 and 22. The switch arms 21 and 22 are pivotally mounted on the drum 12 by means of pivots 23 and 24, so that they are free to pivot a limited amount relative to the drum 12 about pivot axes which are parallel to the axis of shaft 14.

The pivoted switch arms 21 and 22 carry on their outer extremities adjustable contacts 25 and 26 which are adapted to cooperate with stationary, electrically connected contacts 27 and 28 which are mounted adjacent the outer periphery of the drum 12. As shown, the contacts 27 and 28 may be formed by bending a strip of suitable metal 29 in a U-shape so that the leg portions form the contacts 27 and 28 and the center section provides a means of fastening the contacts to the drum 12 and also for electrically connecting the contacts 27 and 28.

The pivoted switch arms 21 and 22 are biased by suitable compression springs 30 and 31 so that the cooperating contacts 25, 27 and 26, 28 are biased into engagement. As shown, the compression springs 30 and 31 are supported between the pivoted switch arms 21 and 22 and suitably positioned lugs 32 and 33 which are mounted on, and extend outwardly from, the drum 12.

For the purpose of providing a sequential switching action for reasons which will subsequently be apparent, an arrangement is provided so that when the shaft 14 and the rotatable member 11 are rotated a predetermined clockwise distance relative to the drum 12, the cooperating contacts 17 and 19 first engage. Upon a subsequent further clockwise rotational movement of the member 11 relative to the drum 12, the pivotally mounted switch member 21 is caused to rotate clockwise so as to open the cooperating contacts 25 and 27. In order to obtain this sequential switching action, the contact 19 is mounted on one end of a resilient switch arm 34, the other end of which is fastened on the pivoted switch arm 21 as by welding or in any other suitable manner. As shown, the switch arm 34 has a Z-shape so that the outer end which carries the contact 19 has a certain amount of spring movement relative to the switch arm 21. Thus when the contacts 17 and 19 first engage upon a clockwise rotation of the shaft 14, the contacts 27 and 25 are maintained in engagement by the biasing spring 30. However, upon a further clockwise rotation of the shaft 14 and a consequent deflection of the resilient switch arm 34, a point is reached where sufficient pressure is exerted on the switch arm 21 to rotate it clockwise and open the cooperating contacts 25 and 27.

In a similar manner the contact 20 is mounted on one end of a Z-shaped resilient switch arm 35, the other end of which is welded or otherwise secured to the pivoted switch arm 22. Thus upon a counterclockwise rotation of the shaft 14, the cooperating contacts 18 and 20 first engage with the cooperating contacts 26 and 28 remaining in engagement under the influence of the biasing spring 31. However, upon subsequent additional counterclockwise rotation of the shaft 14, the resilient switch arm 35 is deflected to a point where sufficient force is exerted on the pivoted switch 22 to pivot it in a counterclockwise direction, whereby the cooperating contacts 26 and 28 are opened. It will therefore be apparent that upon a clockwise rotation of the shaft 14 through a dead zone determined by the amount of free rotation of the rotatable member 11, the cooperating contacts 17 and 19 will first engage, and subsequently the cooperating contacts 25 and 27 will be disengaged. Similarly, upon a counterclockwise rotation of the shaft 14 through the dead zone, cooperating contacts 18 and 20 will first engage and cooperating contacts 26 and 28 will subsequently be disengaged. The purpose of the sequential switching action will become apparent as the description proceeds.

The drum 12, which is formed of electrically insulating material, is shown as being loosely mounted on the shaft 14 so that it is free to rotate relative thereto about an axis coincident with the axis of the shaft 14. For the purpose of rotating the drum 12 in either direction about the shaft 14, there is provided a reversible motor 36, the output of which is coupled through a gear reduction 37 to a low speed output shaft 38. The output shaft 38 carries a pinion 39 which meshes with a spur gear 40 which is mounted on and rotates with the drum 12. The reversible motor unit 36 is shown as comprising self-starting and synchronous motor elements 41 and 42 having rotors mounted on a common output shaft. The arrangement is such that the output shaft at 38, and consequently the drum 12, rotates in either direction, depending upon whether motor units 41 or 42 are energized. Reversible motors of this type are well known and for a further description reference may be had to the disclosure of Patent 1,944,083, Holland, dated January 13, 1934.

In order to rotatably position the shaft 14 in accordance with the azimuth heading of the vehicle on which the gyroscope is mounted, there is provided means for driving the shaft 14 in accordance with the output of the vehicle's compass, indicated diagrammatically at 43. The compass 43 is shown as having an output shaft 44, the rotative position of which indicates the vehicle's heading. The shaft 44 is mechanically coupled to a selsyn transmitter 45 which electrically transmits the angular position of shaft 44 to a receiver selsyn 46 having an output shaft 47 which rotates in correspondence with shaft 44. The shaft 47 is coupled to shaft 14 through a conventional friction slip clutch 48 which permits relative rotation between shafts 14 and 47 in the event that the shaft 47 tries to rotate at a rate greater than shaft 14 is permitted to rotate by the speed of the motor.

The turn cutout of the present invention depends for its operation upon the provision of an arrangement for deenergizing the electromagnet 7 in the event that the rate of turn of the vehicle and consequently shaft 14 is greater than a reference speed which is the speed at which the reversible motor 36 drives the drum 12. To this end the electromagnet 7 is energized from a suitable power supply 49 through a circuit which includes the serially connected cooperating contacts 26, 28 and 27, 25. To conduct the current to and from the contacts 26, 28 and 27, 25 there are provided two slip rings 50 and 51 which are mounted on the insulating drum 12 as shown and which are in electrical contact with two stationary brushes 52 and 53. The energizing circuit for the electromagnet 7 may be traced as follows: One side of the power supply 49, a conductor 54, brush 52, slip ring 50, a conductor 55, contacts 26, 28, the conductor 29, contacts 27, 25, a conductor 56, slip ring 51, brush 53, a conductor 57, the electromagnet 7, and a conductor 58 which is connected to the other side of the power supply 49. With this arrangement it will be evident that an opening of either contacts 26, 28 or the contacts 27, 25 will deenergize the electromagnet 7 and thereby disable the erection system of the gyroscope.

In order to cause the reversible motor 36 to drive the drum 12 at a reference speed in the same direction as the shaft 14, there is provided a jogging control which is arranged to energize motor 36 to drive the drum clockwise when contacts 17 and 19 engage and to drive the drum counterclockwise when contacts 18 and 20 engage. The motor units 41 and 42 which, when selectively energized, cause counterclockwise and clockwise rotation, respectively, of the drum 12 are connected through the control contacts 18, 20 and 17, 19 through slip rings 59 and 60 which are mounted on insulating drum 12 and which engage, respectively, stationary brushes 61 and 62. The energizing circuit for the motor to cause counterclockwise rotation of the drum may be traced as follows: one side of the power supply 49, brush 52, slip ring 50, conductor 63, switch arm 16, contacts 18 and 20, switch arm 35, conductor 64, slip ring 59, brush 61, conductor 65, motor unit 41, and conductor 66 back to the other side of the power suppply 49. The energizing circuit for the motor to cause clockwise rotation of the drum may be traced as follows: one side of the power supply 49, conductor 54, brush 52, slip ring 50, conductor 63, switch arm 16, contacts 17 and 19, switch arm 34, a conductor 67, slip ring 60, brush 62, a conductor 68, motor unit 42 and a conductor 69 back to the other side of the power supply 49. It will therefore be clear that when shaft 14 rotates counterclockwise to cause engagement of contacts 18 and 20, the motor 36 will be energized to drive the drum 12 in a counterclockwise direction, tending to move contact 20 away from contact 18. Similarly, when the shaft 14 rotates clockwise to cause engagement of contacts 17 and 19, the motor 36 will be energized to drive the drum 12 in a clockwise direction tending to move contact 19 away from contact 17. It will be seen that the action is such that if the shaft 14 rotates in either direction at a speed less than the speed at which the motor 36 can drive the drum 12, the drum will be jogged along with the shaft 14 and contacts 26, 28 and 25, 27 will remain closed. However, if the shaft 14 rotates faster than the motor can drive the drum, switch arms 21 or 22 will be pivoted to open either contacts 26 and 28 or contacts 25 and 27, depending on whether the rotation of shaft 14 is counterclockwise or clockwise as the case may be.

The operation is as follows: When the vehicle on which the gyroscope is mounted is proceeding on a straight course, the compass output shaft 44 and shaft 14 are stationary and switch arm 16 lies between the pivoted switch arms 21 and 22 so that contacts 18, 20 and 17, 19 are open and the motor 36 consequently is inactive. Contacts 26, 28 and 25, 27 are closed so that electromagnet 7 is energized and the erection system of the gyroscope operates in a normal manner to keep the gyroscope spin axis vertical.

Assume now that the vehicle makes a slow turn, say to the right, at a rate sufficiently slow that disconnection of the erection system is not warranted. It will be assumed that for this direction of turn the shaft 14 rotates clockwise, causing contacts 17 and 19 to engage. This energizes motor 36 in a direction to rotate drum 12 clockwise at the reference speed which is greater than the assumed rate of turn. Because of the jogging action contact 17 does not press against contact 19 hard enough to cause a pivoting of switch arm 21 so that contacts 25 and 27 remain closed and the excitation of the electromagnet 7 is unaffected.

Assume now that the rate of turn of the vehicle is increased to a rate greater than the rate at which motor 36 can drive drum 12. This causes contact 17 to exert an increasing pressure on contact 19 so that switch arm 21 is pivoted clockwise opening contacts 25 and 27, thereby disconnecting electromagnet 7 and disabling the gyroscope erection system. Contacts 25 and 27 will remain open until the rate of turn of the vehicle is decreased to a point where motor 36 can drive drum 12 ahead of shaft 14 and thereby effect a closure of contacts 25 and 27, reconnecting the erection system.

If the vehicle turn is to the left a similar action takes place, the contacts 18 and 20 closing to cause the drum to rotate counterclockwise and the contacts 26 and 28 opening if the rate of left turn is greater than the rate at which drum 12 is rotated, thereby disabling electromagnet 7 and the gyroscope erection system.

During rates of vehicle turn greater than the rate at which drum 12 rotates, the shaft 14 rotates faster than the drum until the switch arm 21 or 22 is pressed against the stop 32 or 33. Thereafter the speed of rotation of shaft 14 is limited to the speed of the drum. If it were not for the friction clutch 48 the selsyn receiver shaft 47 would be forced out of correspondence with the compass output shaft 44 which is undesirable and would prevent proper operation. The friction clutch prevents this, however, by permitting relative rotation between shafts 14 and 47 so that the receiver selsyn can maintain correspondence with compass shaft 44 when this condition obtains.

It will be understood that the critical rate of turn of the vehicle at which the electromagnet 7 is disconnected is determined by the rate at which the motor 36 drives the drum 12 and that the critical rate can be made any desired value by selecting a suitable motor speed and gear ratio between the motor and the drum.

It will be apparent from the foregoing that I have provided a novel erection system disconnect device for a gyroscope mounted on a moving vehicle which is relatively simple in construction and which acts to positively and accurately disconnect the erection system at a predetermined vehicle turning speed.

While I have shown and described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. A cutout device for disabling an erecting device for a gyro vertical adapted to be mounted on a moving vehicle, said cutout device comprising first and second members independently rotatable within a predetermined range, means for rotating said first rotatable member at a speed proportional to the turning speed of said vehicle, means for rotating said second rotatable member at a constant reference speed, and means actuated in response to a rotational speed of said first rotatable member greater than the rotational speed of said second rotatable member for disabling said erecting device.

2. In combination, a gyro vertical adapted to be mounted on a moving vehicle, an erecting device for said gyro vertical comprising gyro precessing means controlled by a gravitationally responsive element, and cutout means for disabling said erecting device in response to a rate of turn of said vehicle greater than a predetermined value whereby to prevent turn error arising from the effect of centrifugal force on said gravitationally responsive element, said cutout means comprising first and second members independently rotatable within a predetermined range, means for rotating the first rotatable member at a speed proportional to the turning speed of said vehicle, means for rotating the second rotatable member at a constant reference speed, and means actuated in response to a rotational speed of said first rotatable member greater than the rotational speed of said second rotatable member for disabling said erecting device.

3. A cutout device for disabling an electrically operated erecting device for a gyro vertical adapted to be mounted on a moving vehicle, said cutout device comprising first and second members independently rotatable within a predetermined range, means for rotating one of said rotatable members in accordance with the rate of turn of said vehicle, reversible motor means for driving the other of said rotatable members at a predetermined reference speed, first switching means actuated in response to rotation of said first rotatable member relative to said second rotatable member for energizing said motor means in a direction to rotate said second rotatable member in the same direction as said first rotatable member, second switching means for disabling the erecting device of said gyro vertical, and means associated with said rotatable members for actuating said second switching means in response to rotation of said first rotatable member at a speed greater than the speed of said second rotatable member when driven by said motor means.

4. In combination, a gyro vertical adapted to be mounted on a moving vehicle, an erecting device for said gyro vertical comprising an electrically operated gyro precessing means controlled by a gravitationally responsive element, and cutout means for disabling said erecting device in response to a rate of turn of said vehicle greater than a predetermined value whereby to prevent turn error arising from the effect of centrifugal force on said gravitationally responsive element, said cutout means comprising first and second rotatable members, means for rotating the first rotatable member in accordance with the turning speed of said vehicle, reversible motor means for driving the second rotatable member at a predetermined reference speed, cutout switch means actuated by the first rotatable member when the rotational speed of the first rotational member exceeds that of the second rotational member, said cutout switch means being connected to control said gyro precessing means and jogging switch means controlled by the first rotatable member for controlling said motor means to drive the second rotatable member ahead of the first rotatable member whereby to effect closure of said cutout switch means.

5. In combination, a gyro vertical adapted to be mounted on a moving vehicle, an erecting device for said gyro vertical comprising an electromagnet, cutout means for disabling said electromagnet when the rate of turn of said vehicle exceeds a predetermined value, said cutout means comprising a first rotatable member rotatably positioned in accordance with the heading of said vehicle, a second rotatable member rotatably positioned by a constant speed reversible motor, a first switching means actuated by relative rotation of said rotatable members for controlling the direction of rotation of said motor, and a second switching means actuated by further relative rotation of said rotatable members beyond that required for operation of said first switching means for disabling said electromagnet.

6. A turn cutout device for controlling an electrically operated erection system of a gyroscope adapted to be mounted on a moving vehicle comprising a rotatable shaft, means for rotatably positioning said shaft in accordance with the azimuth heading of said vehicle, a rotatable member mounted for rotation with respect to said shaft, reversible motor means for driving said rotatable member at a constant reference speed, normally open and normally closed switching means mounted on said rotatable member, an actuating arm connected to said shaft and adapted to cause sequential operation of said normally open and normally closed switching means upon relative rotation of said shaft and said rotatable member, said normally open switching means being connected when closed to energize said motor means to drive said rotatable member in the same direction as said rotatable shaft after closure by movement of said actuating arm whereby said normally closed switching means is not opened by said actuating arm until the rate of change of azimuth heading of said vehicle is greater than said reference speed, and means for connecting said normally closed switching means to control the erection system of said gyroscope.

References Cited in the file of this patent

UNITED STATES PATENTS

| | | |
|---|---|---|
| 1,831,597 | Henderson | Nov. 10, 1931 |
| 1,942,470 | Bassett | Jan. 9, 1934 |
| 2,525,108 | Wolfert | Oct. 10, 1950 |

FOREIGN PATENTS

| | | |
|---|---|---|
| 492,670 | Great Britain | Sept. 23, 1938 |
| 91,196 | Sweden | Jan. 5, 1938 |

OTHER REFERENCES

Westinghouse Electric and Manufacturing Company, publication "Stable Element Mark 8–Mod. 4," page 26.